Aug. 9, 1938. G. F. WEIHER 2,126,158
REFRIGERATING APPARATUS
Filed Dec. 29, 1934  2 Sheets-Sheet 2

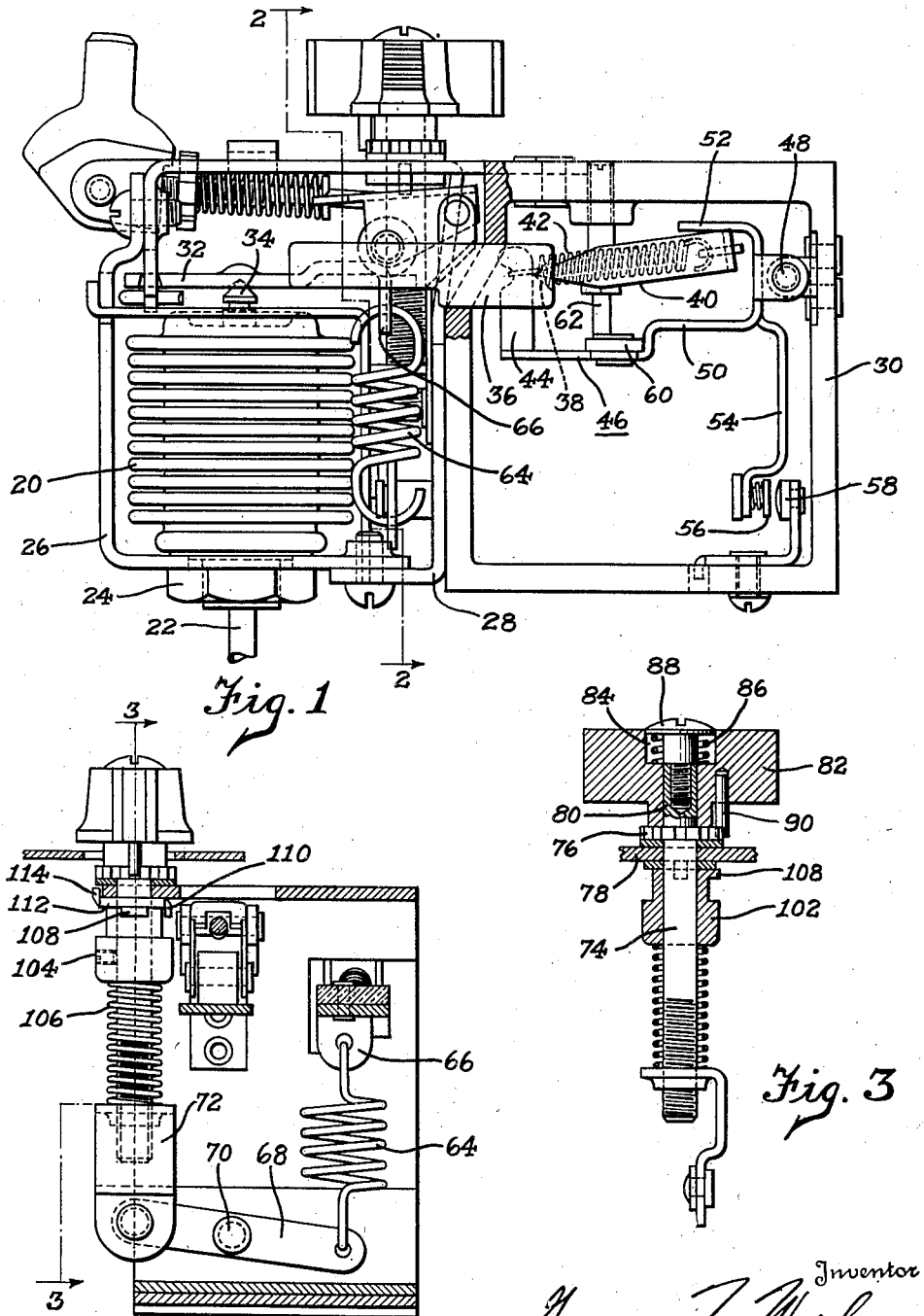

Inventor
George F. Weiher
By Spencer Hardman and Lehr
Attorneys

Patented Aug. 9, 1938

2,126,158

UNITED STATES PATENT OFFICE 2,126,158

REFRIGERATING APPARATUS

George F. Weiher, Dayton, Ohio, assignor to General Motors Corporation, Dayton, Ohio, a corporation of Delaware Application December 29, 1934, Serial No. 759,752

6 Claims. (Cl. 200—83)

This invention relates to refrigerating apparatus and more particularly to control means therefor.

A considerable number of service calls on domestic electric refrigerators are due to a desire for slightly different temperature conditions. A considerable number of such requests could be taken care of merely by changing the position of the temperature regulator. This change, however, would not allow a suitable range of movement in both directions of the temperature regulator from the normal position, since the permissible rotation in one direction from normal would always be reduced while the permissible rotation in the opposite direction would be increased. For example, if a colder normal temperature was desired and the temperature regulator was moved to a colder position for normal operation, only a small amount of movement providing a small decrease in temperature would be available for freezing purposes. Also, the changing of the normal position of the temperature regulator in this way creates the impression that the refrigerator is not operating properly, or is operating at an excessively low temperature. This remedy also will not take care of requests for a slightly warmer or a slightly colder condition than can be obtained in any of the positions of the ordinary temperature regulator.

It is an object of my invention to provide for a temperature regulator of a refrigerator control a means by which a limited adjustment beyond the normal range of the temperature regulator may be obtained.

It is another object of my invention to provide a convenient means capable of being readily manipulated by an inexperienced person without tools under proper direction for changing the range of the temperature regulator of a refrigerator control.

Further objects and advantages of the present invention will be apparent from the following description, reference being had to the accompanying drawings, wherein a preferred form of the present invention is clearly shown.

In the drawings:

Fig. 1 is a view partly in section of a control switch for a domestic electric refrigerator;

Fig. 2 is a sectional view taken along the lines 2—2 of Fig. 1;

Fig. 3 is a sectional view taken along the lines 3—3 of Fig. 2;

Figure 5:
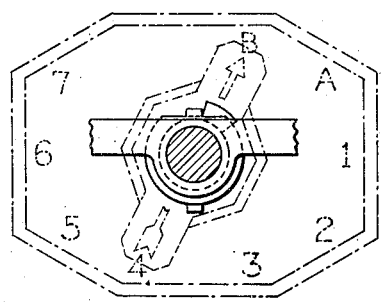
Fig. 5 is a sectional view of a portion of the temperature regulating shaft showing the means for limiting the amount of rotation allowed, together with a dotted view of the temperature regulating knob and its dial.
Figure 6:
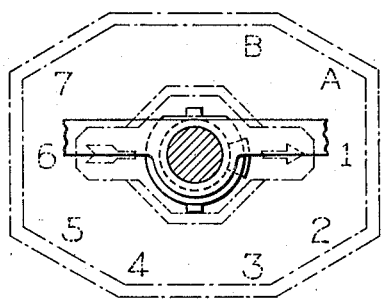
Figure 7:
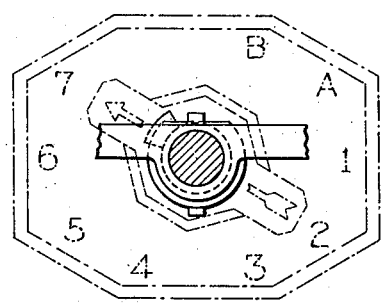
Figure 8:
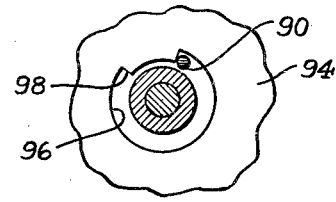

Fig. 6 is a view similar to Fig. 5 with the temperature regulating knob and the limiting means turned to No. 1 position; while Fig. 7 is a view similar to Figs. 5 and 6 with the temperature regulating knob and the limiting means turned to No. 7 position; and Fig. 8 is a sectional view of the lower portion of the temperature regulating knob and the escutcheon plate to show the limiting of the rotary movement of the knob by the aperture in the escutcheon plate.

Referring to the drawings and more particularly to Fig. 1, there is shown a control switch for a domestic electric refrigerator including a metal bellows 20 connected by tubing 22 to a thermostatic bulb or other suitable means (not shown) which is mounted in heat exchange relation with the cooling unit of the domestic electric refrigerator. The thermostatic bulb is preferably charged with a volatile fluid and the changes of temperature of the cooling unit change the vapor pressure within the thermostatic bulb and the bellows. The bellows 20 is fastened by a clamping nut 24 to an L-shaped member 26 which is fastened at both ends to a frame member 28, which in turn is riveted to a box 30 formed of an insulating material such as a phenol condensation product.

Pivoted to the frame member 28 is a primary lever 32 provided with a depression which receives a conical point 34 provided at the upper end of the bellows 20. The free end of the primary lever 32 is provided with an insulating portion 36 formed of a molded insulating material such as a phenol condensation product which is provided with a forked outer end having a pair of V-shaped notches 38 formed on the inside of the forked portion. These V-shaped notches 38 receive a secondary U-shaped lever 40 having chisel-shaped ends which are held within the notches 38 by a tension coil spring 42. This tension type coil spring 42 connects the free end of the secondary lever 40 with the anchor post 44 of a bell crank contact carrying lever 46 which is pivoted upon a pivot pin 48 extending from the wall of the insulated box 30. This bell crank contact carrying lever has a humped portion 50 and a bent portion 52 which serve as stops for limiting the movement of the free end of the secondary lever 40.

The contact carrying lever 46 has a contact carrying arm 54 carrying the switch contact bar 56 which bridges a set of switch contacts 58 located in series with the compressor-motor electric circuit (not shown). The contact carrying lever 46 is also provided with an extension 60 of insulating material which cooperates with a screw 62 to limit the opening movement of the bell crank contact carrying lever 46. Thus, through the proper location of the contact 58 and the screw 62, as well as the stop portions 50 and 52, the angularity of the secondary lever at the point of tripping is controlled and in this way the differential between the opening and closing points is determined. This can, of course, be varied by changing the adjustment of the screw 62. The primary, secondary, and bell crank carrying levers, as well as the toggle spring constitute a double toggle snap acting mechanism for causing the contacts to be opened and closed with a snap action.

A range adjusting means is provided by a tension coil spring 64 connected at its upper end to an ear 66 depending from the primary lever 32 and connected at its lower end to a simple lever 68 pivoted upon the pivot pin 70. This lever 68 at its opposite end is connected by a pivotal connection to a bent member 72 which is threaded upon a rotatable adjusting screw 74.

Heretofore, it has been customary to fasten a temperature regulating knob to the upper end of this adjusting screw 74 by some sort of a splined or keyed connection and to limit the rotation of either the screw or the knob to something less than one turn. A dial has also been provided which cooperates with the knob to indicate different selective positions of the temperature regulator. Such a temperature regulator is used to obtain different desired temperatures within the refrigerator. For example, domestic electric refrigerators are used to a considerable extent for preparing frozen desserts and in so doing, it is desirable in order to obtain a product of fine texture and to speed the freezing process to change the temperature regulator to some of the colder positions at different times during the freezing thereof.

It sometimes occurs that the user of a domestic electric refrigerator feels that for ordinary purposes, the refrigerating system is operating with the evaporator at either too high or too low temperature. While this can ordinarily be taken care of by changing the setting of the temperature regulating knob, this appears to create the impression in the mind of the owner of the refrigerator that something is wrong with the refrigerator in that it does not provide sufficient refrigeration at the normal setting of the temperature regulating knob. Also as pointed out at the beginning of this specification, such a remedy does not allow a suitable range of movement in either direction from the changed normal setting of the temperature, since it reduces the available rotation from normal in one direction and increases the available rotation from normal in the opposite direction. Heretofore, it has been necessary in such cases to send a service man to the home where the refrigerator is installed in order to change the relation between the temperature regulating knob and the temperature regulating screw such as the screw 74. This, however, often creates an unusually large number of service calls which adds to the expense of servicing the refrigerator.

In order to overcome this objectionable situation, I have connected the temperature regulating knob to the screw 74 by a spring clutch which by pulling out the knob and resetting it to another position, the relation between the knob and the screw may be changed. This is made so simple that it can be performed merely by following explicit instructions given over the telephone or in a letter or booklet. However, in order to prevent the setting of the control switch from becoming entirely out of adjustment, I have also provided a limiting device for limiting the rotation of the temperature regulating screw 74 to a little more than one and one-fourth turns. In this way, with complete safety, the use of a domestic electric refrigerator may thus be instructed to make a slight change in the temperature setting of the control switch.

In the mechanism I have disclosed I have provided a serrated head 76 on the upper end of the screw 74. The screw 74 is rotatably mounted upon an ear 78 extending from the frame member 28. The screw 74 also has a portion 80 extending upwardly from the serrated portion 76 upon which a control knob 82 is rotatably mounted. This control knob 82 is provided with a recess 84 which receives a small compression type coil spring 86 extending between the bottom of the recess and the head of a screw 88 which is threaded into the upper end 80 of the temperature regulating screw 74. The temperature regulating knob has a pin 90 extending downwardly therefrom into engagement with the serrated head 76. This pin thus connects the temperature regulating knob 82 with the screw 74. By pulling outwardly on the temperature regulating knob 82 the pin 90 is disengaged from the serrated head 76 and the knob may be rotated independently of the screw 74 and its serrated head 76 to another position where the knob may be released and the pin may be permitted to engage another portion of the serrated head 76 in order to change the relation between the knob 82 and the temperature regulating screw 74.

Figure 4:
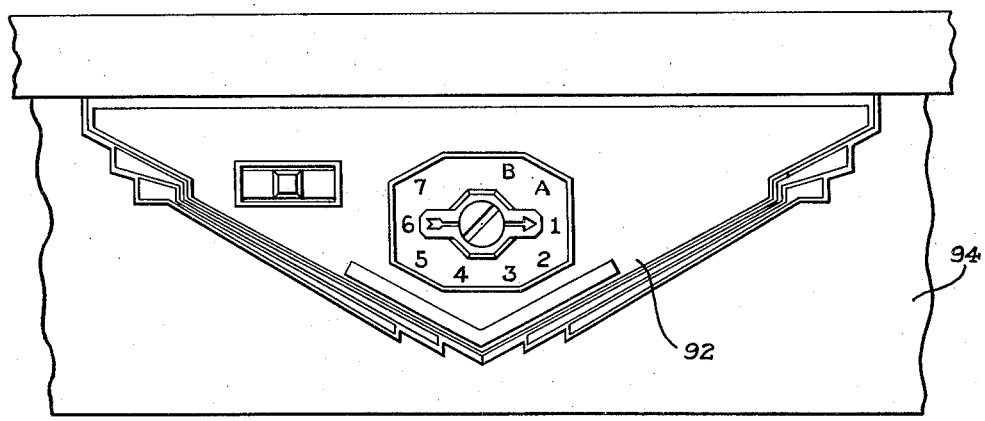
Fig. 4 is a front view of a portion of a domestic electric refrigerator showing the temperature regulating knob and dial, as well as the escutcheon plate.

The temperature regulating knob 82 is provided with an arrow on its upper face as shown in Fig. 4 which cooperates with a dial containing the legends "B", "A" and 1 to 7 inclusive which are provided upon an escutcheon plate 92 mounted upon the upper portion of the outer wall 94 of a domestic electric refrigerator. This escutcheon plate 92 is provided with an aperture 96 beneath the temperature regulating knob, which aperture is provided with an ear 98 which cooperates with the pin 90 to limit the rotation of the temperature regulating knob 82 to slightly less than one complete turn.

In order to prevent the mere friction between the temperature regulating knob 82 and the screw 74 from turning the screw when the pin 90 is withdrawn from engagement with the serrated head 76, I provide a collar 102 fixed to the shank of the screw 74 by a set screw 104. Surrounding the screw 74 between the collar 102 and the bent member 72, is a light compression spring 106 which places a frictional resistance to the rotation of the screw 74. In this way, the frictional resistance to the rotation of the screw 74 is made greater than the frictional resistance of the rotation of the knob 82 upon the upper end of the screw. In this way, rotation of the screw 74 when the pin 90 is released is thereby prevented.

In order to prevent the temperature regulator from being thrown completely out of adjustment, I have provided a projection 108 which extends from a reduced portion of the collar 102 and which cooperates with a downwardly turned projection 110 upon a washer 112 loosely mounted upon the screw 74 between the collar 102 and the ear 78 of the frame member 28. This washer also has an upwardly turned projection 114 which engages the edge of the frame member 28 adjacent the ear 78 so as to limit the rotation of the washer to about a half a turn. The connection between the loosely mounted washer 112 and the collar 102 provides an additional amount of movement amounting to almost a complete turn. Thus, the movement of the adjusting screw which is permitted by this loose washer mechanism is slightly less than one and one-half turns and in reality amounts to about one and one-fourth turns because of the width of the projection 108 and the width of the projections 110 and 114. In order to secure any further adjustment of the temperature regulating screw 74, it is necessary to unscrew the set screw 104 of the collar 102 so that the screw 74 may be turned the desired amount independently of the collar 102. Inasmuch as the control of the refrigerating system in the ordinary type of refrigerator is governed by the temperature of the evaporator, it is usually found desirable to set the temperature regulator to a warmer position on cold days so that the food compartment will not become too cold on such days because of the lesser heat leak, while it is often desirable to change the temperature regulator to a colder position on an extremely warm day to compensate for the greater heat leak. This spring clutch regulating mechanism may thus be used to advantage for changing the range of the temperature regulator during different seasons, that is, to provide a colder range during the summer and a warmer range during the winter or to obtain a greater range of temperature selection than permitted by an ordinary temperature regulator.

It has also been found that altitude differences in causing differences in atmospheric pressure affect the setting of switches. This is quite a trouble factor in very hilly and mountainous cities and regions since a single dealer in a mountainous locality may install refrigerators in homes differing in elevation of more than a thousand feet. In such a situation, my improved mechanism may be manipulated to change the range of the temperature selector so as to compensate for the differences in altitude.

The tension of the bellows and springs of the switch often change slightly after a period of time due to temperature changes and normal use and such changes may also be compensated for by employing my spring clutch regulating mechanism to change the setting of the switch.

While the form of embodiment of the invention as herein disclosed, constitutes a preferred form, it is to be understood that other forms might be adopted, all coming within the scope of the claims which follow.

What is claimed is as follows:

1. A controller including pressure operated means and means operated by the pressure operated means for controlling the flow of a medium, a rotatable means for controlling the operation of the pressure operated means, a dial, a finger manipulator cooperating with the dial, said finger manipulator having a selective spring clutch means for connection to the rotatable means in a plurality of selective positions to adjust said rotatable means, and means for limiting the rotation of the rotatable means independently of the finger manipulator.

2. A controller including pressure operated means, means operated by the pressure operated means for controlling the flow of a medium, rotatable means for controlling the operation of the pressure operated means, a dial, a manipulator cooperating with the dial, clutch means for clutching the manipulator to the rotatable means, said clutch means including spring means acting upon the manipulator for resiliently urging the manipulator into clutching engagement with the rotatable means.

3. A controller including pressure operated means, switch means operated by the pressure operated means for controlling the flow of electric energy, rotatable means for controlling the operation of the pressure operated means, a dial, a manipulator cooperating with the dial, clutch means for clutching the manipulator to the rotatable means, said clutch means including spring means acting upon the manipulator for resiliently urging the manipulator into clutching engagement with the rotatable means.

4. A controller including pressure operated means, switch means operated by the pressure operated means for controlling the flow of electric energy, spring means for controlling the operation of the pressure operated means, means for adjusting said spring means, a dial, a manipulator cooperating with the dial, means coacting with said manipulator to limit the adjustment of said spring adjusting means within predetermined limits including clutch means to detachably connect said manipulator to said spring adjusting means, said manipulator being adjustable to a plurality of selective positions within said predetermined limits.

5. A controller including pressure operated means, means operated by the pressure operated means for controlling the flow of a medium, rotatable means for controlling the operation of the pressure operated means, a manipulator, clutch means for clutching the manipulator to the rotatable means in a plurality of selective positions, and means for limiting the rotation of the rotatable means independently of the manipulator.

6. A controller including in combination a pressure operated means, rotatable means for controlling the operation of the pressure operated means, a manipulator having means to permit selective engagement with said rotatable means, said manipulator having a primary range of adjustment, means providing a secondary range of adjustment greater than said primary range, and means to resist rotation of said secondary range means while said primary range means is being adjusted.

GEORGE F. WEIHER.